Jan. 14, 1930.　　　　　E. P. ROSS　　　　1,743,239
NAVIGATIONAL COMPUTING INSTRUMENT
Filed Sept. 15, 1923　　　7 Sheets-Sheet 1

INVENTOR
ELLIOTT P. ROSS
BY Moakley and Gill ATTORNEYS

Jan. 14, 1930.  E. P. ROSS  1,743,239
NAVIGATIONAL COMPUTING INSTRUMENT
Filed Sept. 15, 1923   7 Sheets-Sheet 2

INVENTOR
ELLIOTT P. ROSS
BY Moseley and Gill ATTORNEYS

Jan. 14, 1930.  E. P. ROSS  1,743,239
NAVIGATIONAL COMPUTING INSTRUMENT
Filed Sept. 15, 1923  7 Sheets-Sheet 3

INVENTOR.
ELLIOTT P. ROSS
BY Mauchly and Gill
ATTORNEYS.

Jan. 14, 1930.　　　　　E. P. ROSS　　　　　1,743,239
NAVIGATIONAL COMPUTING INSTRUMENT
Filed Sept. 15, 1923　　　7 Sheets-Sheet 5

INVENTOR.
ELLIOTT P. ROSS
BY Moakley and Gill
ATTORNEYS.

Jan. 14, 1930.   E. P. ROSS   1,743,239
NAVIGATIONAL COMPUTING INSTRUMENT
Filed Sept. 15, 1923   7 Sheets-Sheet 7

INVENTOR
ELLIOTT P. ROSS
BY Moakley and Gill
ATTORNEYS

Patented Jan. 14, 1930

1,743,239

UNITED STATES PATENT OFFICE

ELLIOTT P. ROSS, OF FREEPORT, NEW YORK, ASSIGNOR TO FORD INSTRUMENT COMPANY, INC., OF LONG ISLAND CITY, NEW YORK, A CORPORATION OF NEW YORK

NAVIGATIONAL COMPUTING INSTRUMENT

Application filed September 15, 1923. Serial No. 662,817.

This invention relates to aerial navigation and has for a purpose assistance to the pilot of an airplane, in that he may make simple settings in a calculating apparatus, and have visually presented to him resultant indications, enabling him to maintain a desired ground course, and to have a knowledge of the speed at which he is traversing that course.

While the calculating apparatus may be installed in any convenient manner, it advantageously takes the form of an instrument well suited to be mounted on the dashboard of an airplane, within convenient sight and easy reach of the pilot. The instrument, which may be descriptively termed a heading and ground speed computer, is in the nature of a self-contained unit, and when set by the pilot will reveal to him the proper heading for the airplane, in view of the prevailing aerial conditions, whereby it will travel over the desired ground course, as well as the ground speed at which it is traveling. The angle between the heading of the airplane and the desired ground course is also shown to the pilot by the instrument, and the inter-relation of the dials permits ready mental verification of the different readings of the instrument, if desired.

In setting the heading and ground speed computer, the presence or absence of wind is indicated, and when represented as being present, its velocity and direction are also shown.

Provision is made to guard against accidental injury to the mechanism of the instrument, if the pilot unwittingly exceeds maximum settings, and there is no particular requirement for caution in operating the device, other than that which would naturally be exercised in ordinary usage.

Constituting a further advantage, is the fact that by the use of the present invention in the solution of problems, it is unnecessary to know the altitude of the aircraft, in contradistinction to other hitherto employed methods, thus simplifying the procedure.

Such other advantages and novel features as may appear hereinafter are, of course, to be regarded as coming within the scope of the present invention, and alterations and modifications in the structure and details may be indulged in without departing from the spirit of the invention as defined in the appended claims.

Figures 1, 2:
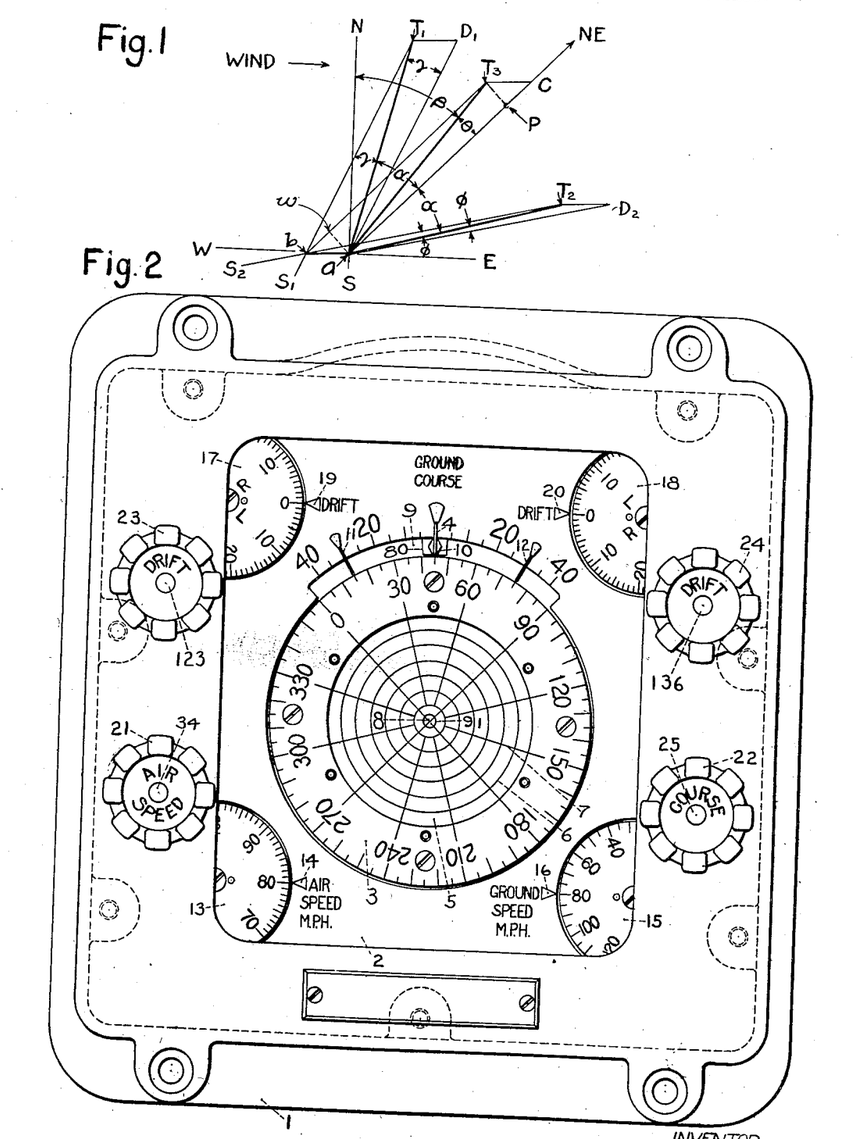
Fig. 1 is a diagrammatic view, illustrating the solution of a problem involving the determination of the heading and ground speed.
Fig. 2 is a face view of the heading and ground speed computing instrument, showing its dials and the setting handles therefor.

The diagram of Fig. 1 shows related and co-operating vector diagrams, from which the mathematical conditions mechanically produced in the mechanism of the heading and ground speed computing apparatus can be more readily comprehended. In Fig. 1, the cardinal compass points, North, South, East and West, have been indicated as also has a desired ground course for an airplane, which course in this figure, is shown to be due northeast, i. e., along the line $a$—$c$.

As hereinafter set forth, the pilot of the airplane will set up on the computing instrument this desired ground course on a compass dial, and he will also set up on another dial the air speed at which he intends to fly. After the aviator has risen in the air, his aircraft will be subject to drifting in response to the influence of any wind which may be present, or which may develop.

Accordingly, the pilot indulges in certain trial headings made in a prescribed manner. Thus, he will fly to one side of the desired ground course with a heading at an angle $\alpha$ thereto, after which he will similarly fly away from the intended ground course on the other side thereof also heading at an angle $\alpha$, which is equivalent to attempting to fly parallel to the vectors $a$—$T_1$ and $a$—$T_2$. Due, however, to the effect of the wind, when present, the airplane will not travel parallel to the direction of the lines $a$—$T_1$ and $a$—$T_2$ of the trial headings. The length of the vectors $a$—$T_1$, $a$—$T_2$ and $a$—$T_3$ are equal and represent the air speed of the plane.

If the airplane were to begin its first trial course at $a$, in Fig. 1, and head parallel to the vector $a$—$T_1$, and the wind is blowing in the direction of the arrow at a certain velocity, the aircraft would fly over a preliminary ground course along the line $a$—$D_1$, which is one side of a vector parallelogram in which the opposite side thereto is the line $b$—$T_1$. The angle of drift of the airplane due to the wind, while on this preliminary course, is, therefore, equal to the angle $\gamma$ between the vector $a$—$T_1$ and the line $a$—$D_1$. Thus, it becomes known that a point representing one terminal of a wind vector is located on the line $s_1$—$T_1$, though its position thereon is not disclosed by the foregoing procedure.

A second trial course is flown, wherein the trial heading is as much to the other side of the ultimate ground course along the line $a$—$c$ as the first trial course was on the opposite side thereof, i. e., by an amount equal to the angle $\alpha$. If, then, the second trial course is made with a heading represented by the line $a$—$T_2$, the second preliminary flight will be along the line $a$—$D_2$, and the side $b$—$T_2$ is the side opposite and parallel to the side of the vector parallelogram along which the second trial course is flown. Hence, the angle $\phi$ represents the angle of drift of the second preliminary trial course $a$—$D_2$ from the heading $a$—$T_2$.

The intersection of the line $s_2$—$T_2$ from the second preliminary or trial course with the line $s_1$—$T_1$ from the first trial course, definitely locates the point $b$, from which it now becomes known that the wind vector is the line $a$—$b$, extending from the zero point $a$ to the intersection $b$ of the two trial courses, and this wind vector $a$—$b$ is now capable of being measured to disclose the velocity of the wind and its direction.

Were there no wind, the air speed and the ground speed would be the same, and so would the heading of the aircraft and the ground course. In the problem of Fig. 1, however, wind has been shown to be present, and the wind vector $a$—$b$, now established with readable value to the same scale as the vectors $a$—$T_1$, $a$—$T_2$ and $a$—$T_3$, is incorporated in still another vector diagram, which deals with the ultimate desired ground course, which in Fig. 1 is shown to be due northeast, i. e., along the line $a$—$c$.

The line $a$—$c$ is one side of this latest vector parallelogram, and a line $b$—$T_3$ through the other end $b$ of the wind vector is parallel and opposite to the line $a$—$c$. Opposite and parallel to the wind vector $a$—$b$ is the side $c$—$T_3$ of the parallelogram constructed about the vector $a$—$T_3$, which vector represents the speed and the heading the airplane must have to travel over the desired due northeast ground course, i. e., along the line $a$—$c$.

Inasmuch as the airplane, instead of flying directly along the line of its heading, which is the vector $a$—$T_3$, travels over the desired ground course $a$—$c$, the vector $a$—$T_3$ is the hypotenuse of an imaginary right triangle wherein the distance $a$—$P$ on the line $a$—$c$ is the product of the vector $a$—$T_3$ and the cosine of the angle $\theta$, which has its vertex at $a$. The distance $a$—$P$ thus represents a component of the vector $a$—$T_3$ in the direction of the travel of the airplane. The distance from the point $a$ to the point $P$ is shorter than the vector $a$—$T_3$, due to the heading of the airplane in the direction of this vector. The wind which necessitates such heading has a component $P$—$c$, which contributes to the propulsion of the airplane, the ground speed of which equals the algebraic sum of the vector component $a$—$P$ and the wind component $P$—$c$.

From the foregoing analysis of the problem of Fig. 1, the treatment by the instrument of such problems will be more easily understood.

Fig. 2 shows the heading and ground speed computing instrument, as the airplane pilot observes it, in its position for use by him. Its cover 1 has the appearance of an outlining frame, which circumscribes a glass-covered area, through which the face plate 2 of the instrument is seen. The face plate 2 has a relatively large central opening which is substantially conformed to a compass or azimuth ring dial 3 rotatable therein, the azimuth graduations of the compass dial reading against a fixed pointer 4 mounted on the face plate.

Figures 15, 16, 17, 18:
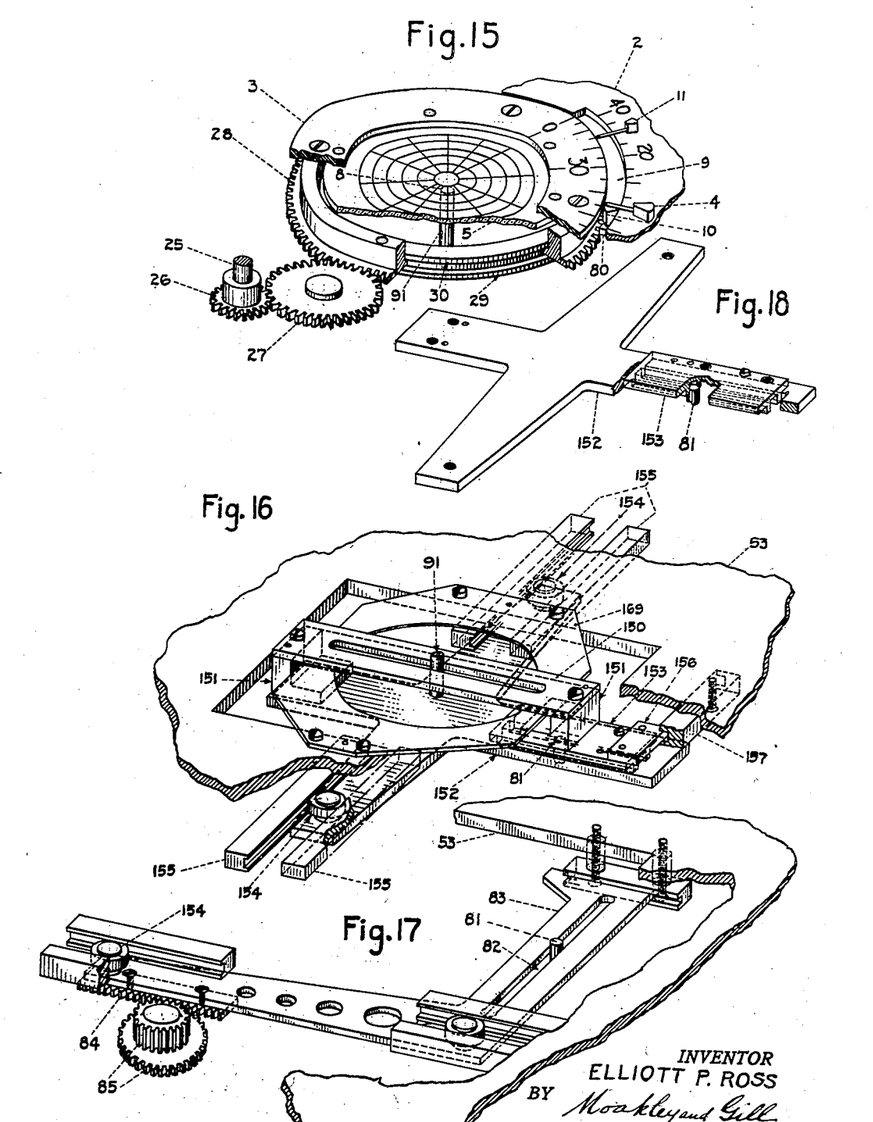
Fig. 15 is a perspective view of the compass ring dial, the transparent wind velocity and direction dial, and associated parts, which are substantially at the level indicated by the line 15—15 of Fig. 5.
Fig. 16 is another perspective view from substantially the same point of observation, but showing the slotted straight slide that is supported at its opposite ends by brackets mounted on the cruciform slide, these and their associated parts being approximately at the level indicated by line 16—16 of Fig. 5.
Fig. 17 is a similar perspective view of the L-shaped slide which is substantially at the level indicated by line 17—17 of Fig. 5, some additional parts associated therewith being also shown.
Fig. 18 is a perspective view of the cruciform slide detached from other parts, except for the channel member fitted into a slot in one of its arms, certain parts being broken away for the sake of improved illustration.

The compass ring dial 3, as shown in both Figs. 2 and 15, forms a circular border for a circular central transparent plate 5, which may be of celluloid, and upon which there are engraved a series of concentric circles 6 and a plurality of angularly spaced radial lines 7. A movable spot 8 co-acts with these concentric circles and radial lines, as hereinafter set forth, to show the velocity and direction of the wind.

For a certain distance each side of the compass dial pointer 4, the central opening of the face plate 2 is retracted from the edge of the compass dial 3, thus forming a curved slot 9, in which a double pointed or diamond-shaped pointer 10 is adapted to travel. This double pointer reads against the compass ring dial 3 to show the proper heading of the airplane for causing it to travel over a desired ground course. The diamond-shaped pointer 10 also reads against a scale that lies along the retracted portion of the edge of the central opening of the face plate, and gives a reading which shows in degrees the angle between the required heading of the airplane and the desired ground course.

A certain distance on opposite sides of the compass pointer 4, are other pointers 11 and 12, which read against a compass dial 3 to show the proper preliminary trial headings that the aviator shall make in determining the airplane heading that is to be maintained to accomplish the adherence of the airplane to the desired ground course.

At its four corners, the face plate 2 is recessed to partially embrace circular dials, at its lower left hand corner being conformed to the contour of an air speed dial 13, which reads against an index 14. A ground speed dial 15 is fitted into the lower right hand corner of the face plate 2 and reads against an index 16, while the upper corners of the face plate receive drift dials 17 and 18, which co-act, respectively, with indexes 19 and 20 to show settings in accordance with the angles of drift due to the wind, on headings indicated by pointers 11 and 12.

On opposite sides of the glass window in the cover 1 are located operating knobs, a knob 21 being operable to effect the setting of the air speed dial. By operating a knob 22, the compass ring dial 3 can be set against the pointer 4, and the knobs 23 and 24 may be turned to set the drift dials 17 and 18 against their respective indexes 19 and 20.

Figure 4:
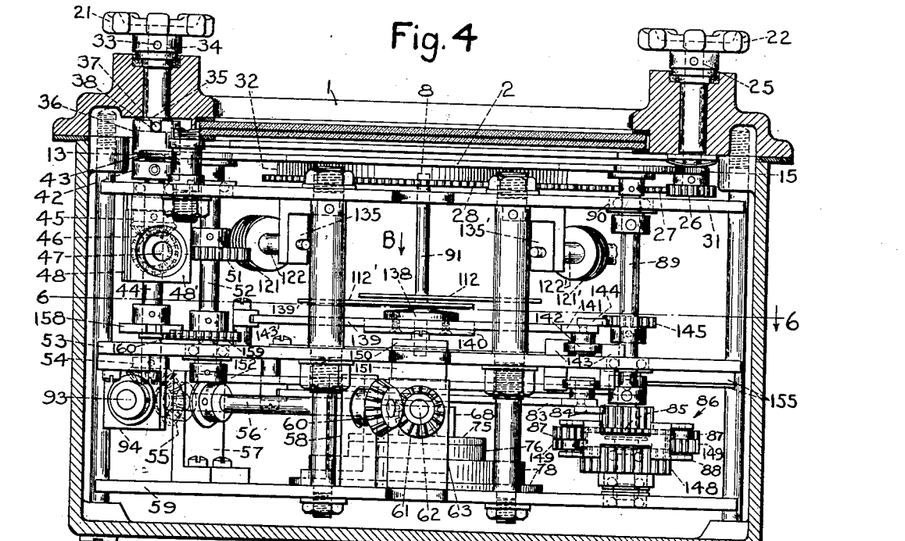
Fig. 4 is an elevational view of the mechanism as observed in the direction of the arrow A in Fig. 3, the casing and cover being shown in section.

In placing the instrument in use, the pilot turns the compass dial-actuating knob 22, and with it a shaft 25 and a pinion 26 affixed thereto as shown in Figs. 4 and 15. This pinion meshes with an idler gear 27 that drives a ring gear 28. As clearly illustrated in Figs. 5 and 15, the inner periphery of the ring gear 28 is rotatively confined in a circular groove formed by a pair of rings 29 and 30, which are held together and secured to a fixedly positioned plate 31, as by screws. The gear ring 28 is provided on one side with an annular flange 32, held against the edge of which is the compass ring dial 3, screws passing through the latter and being threaded into the flange of the gear ring 28. The pilot continues to turn the knob 22 until the compass ring 3, in being turned through the described drive, moves that one of its graduations that indicates the desired ground course for the airplane into register with the pointer 4. In the diagram of Fig. 1, the desired ground course is due northeast, i. e., along the line $a$—$c$, and, in this case, the graduation on the compass dial 3 which represents 45° will be brought into register with the pointer 4, since the zero graduation of the dial indicates the north, and 45° therefrom in azimuth represents a ground course that is exactly northeast.

Figures 8, 11, 12:
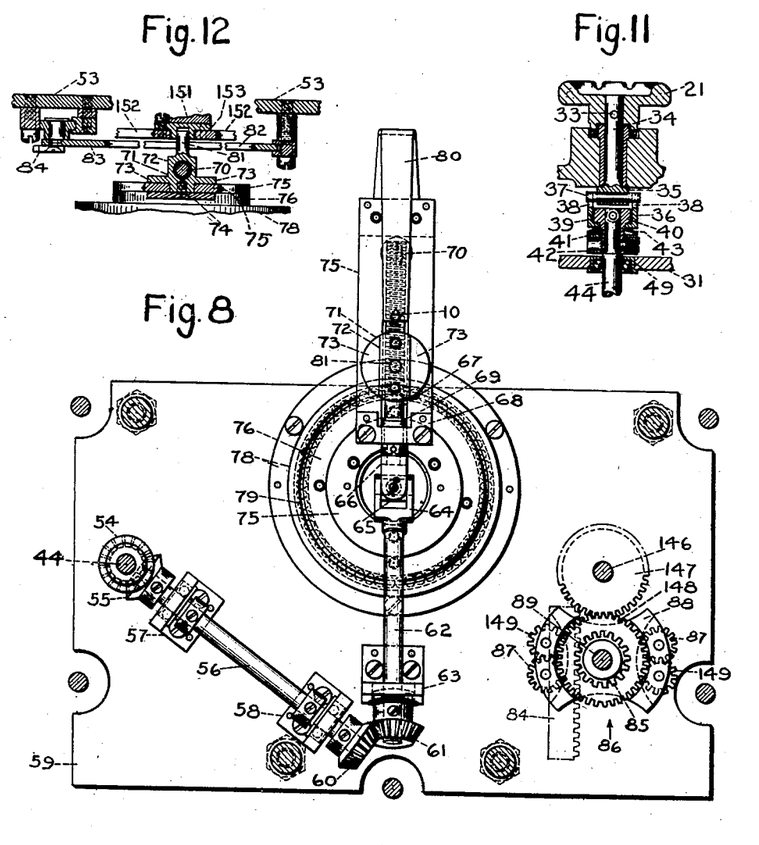
Fig. 8 is a detached view of certain parts of the mechanism shown in Fig. 4, as viewed in the direction of the arrow B, most of the illustrated parts being below the intermediate plate of the frame.
Fig. 11 is a sectional detail, showing one of the friction couplings.
Fig. 12 is a sectional detail taken on the line 12—12 of Fig. 5.

Another predetermination made by the pilot is the air speed at which he shall fly, and, deciding upon this, he turns the knob 21 to introduce the selected air speed for the airplane into the instrument. Referring to Fig. 11, the knob 21 is shown to be affixed by a pin 33 to a short shaft 34, which has an enlarged opposite end 35 that projects into the open end of a cup-shaped coupling member 36, and is provided with a driving pin 37, the opposite ends of which fit into diametrically opposed notches 38 in the wall of the cup.

A second coupling member 39 is telescopically combined with the cup shaped coupling member 36, and has an enlarged head 40 seated in the cup-shaped coupling member 36 to bear against the transverse wall thereof. Passing through a central aperture in this wall is the stem 41 of the coupling member 39, which stem is threaded outside of the cup-shaped coupling member 36, and has adjustably screwed upon it a collar 42. This collar is adjusted to force a spring washer 43 against the transverse wall of the cup-shaped coupling member so as to develop sufficient friction between the same and the other coupling member 39 to cause them to ordinarily turn in unison.

Consequently, when the knob 21 turns the shaft 34, a shaft 44, to which the coupling member 39 is affixed, also turns. Where, however, the mechanism operated by the shaft 44 reaches a limit of movement, or for any other reason resists actuation, a continued turning of the knob 21 will result only in slippage between the friction coupling members 36 and 39, and no damage to the instrument will result.

Figure 3:
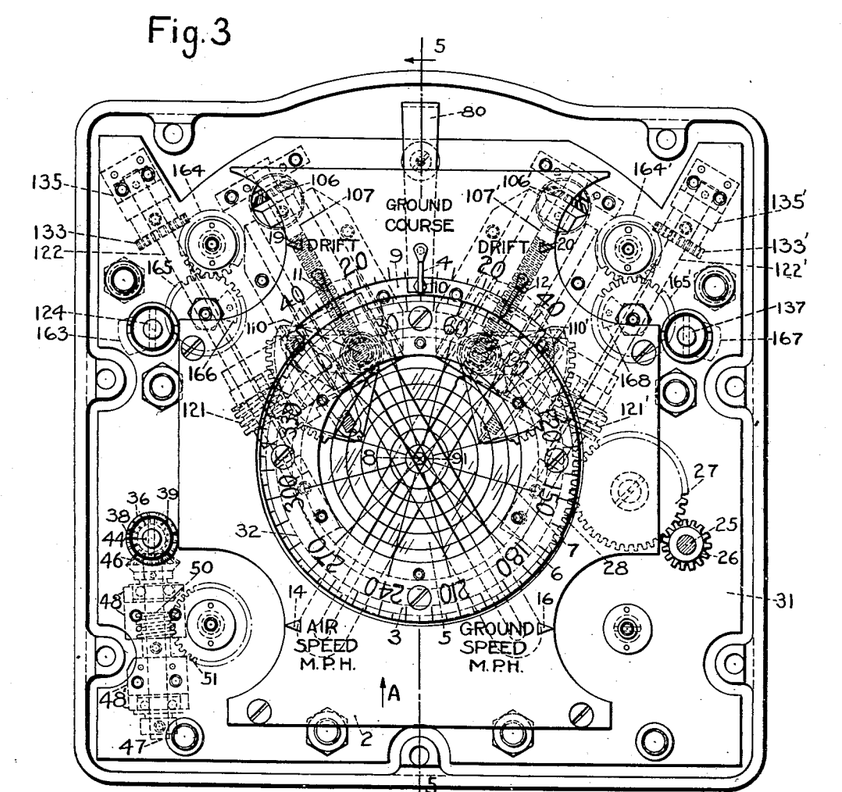
Fig. 3 is a similar view, but with the cover removed, certain dials being omitted for the sake of clearness.
Figure 5:
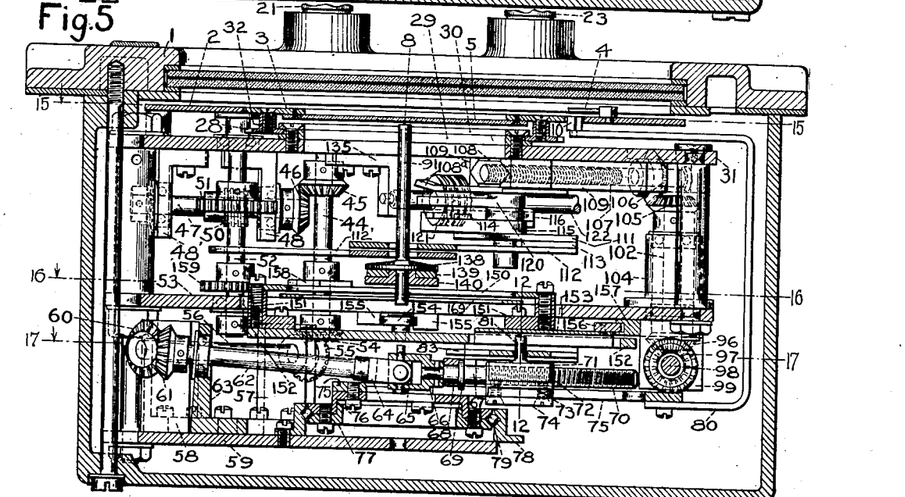
Fig. 5 is a central section through the instrument, the section being taken substantially on the line 5—5, of Fig. 3.

Referring to Figs. 3, 4 and 5, the shaft 44 has mounted thereon a miter gear 45, which meshes with a companion miter gear 46 secured upon a shaft 47. The latter shaft is journalled in ball bearings mounted in spaced bearing brackets 48 and 48', the ball bearings being similar to the one shown at 49 in Fig. 11, and the brackets being secured to the plate 31.

Also carried by the shaft 47 is a worm 50, which meshes with a worm gear 51 that is mounted upon another shaft 52. The shaft 52 is journalled in ball bearings, one of which bearings is fitted into the plate 31, the other bearing being mounted in an intermediate fixed plate 53. On the shaft 52, outside of the plate 31, is mounted the air speed dial 13, which turns, through the just traced drive, when the knob 21 is actuated. When the graduation on the air speed dial that represents the intended air speed of the airplane is brought opposite the index 14, the pilot ceases turning the knob 21.

Whenever the knob 21 is turned to cause the dial 13 to register with the index 14 to show the proposed air speed for the airplane, another miter gear 54, which is also affixed to the shaft 44, drives a miter gear 55 on a shaft 56, which is mounted in ball bearings that are retained in bearing brackets 57 and 58, as shown in Figs. 4 and 8. The brackets 57 and 58 are carried by a fixed plate 59.

Projecting beyond the bracket 58, the shaft 56 is provided with another miter gear 60, which meshes with a companion miter gear 61, which is carried on the adjacent end of another shaft 62, as readily seen in Fig. 8. Near the hub of the gear 61, the shaft 62 is supported in a ball bearing in a bearing bracket 63, which is carried by the fixed plate 59. At its opposite end, the shaft 62 is provided with a yoke 64 of a universal joint, which further comprises a block 65, another yoke 66 and suitable pins pivotally combining these parts, as clearly shown in Figs. 5 and 8. The yoke 66 is carried by one end of a shaft 67 that is mounted in a plain bearing formed in a U-shaped block 68. The shaft 67 is provided with a flange 69, which co-acts with the hub of the yoke 66 to prevent longitudinal movement of the shaft 67.

As the shaft 67 is confined to rotary movement, its screw-threaded portion 70 causes a travelling nut 71 to move longitudinally of said shaft. The travelling nut 71 is formed of two parts, one of which, the part 72, has a block-like portion which contains a female screw, threaded through which is the portion 70 of the shaft 69, as shown in Fig. 8. The part 72 of the nut 71 has disk segments 73 projecting from opposite sides of its block-like portion, as shown in Figs. 8 and 12. The other part 74 of the travelling nut 71 is in the form of a disk, which is screwed to a face of the block-like portion of the part 72 of the nut. As shown in Fig. 12, the disk segments 73, portions of the sides of the block portion of the nut part 72, and the disk 74 form grooves on opposite sides of the block portion of the travelling nut 71, which grooves receive the slot-outlining edges of a slotted arm 75.

Extending to the universal joint, the slot of the arm 75 expands into a circular hole, as shown in Figs. 5 and 8, which affords clearance for the yokes 64 and 66 of the universal joint, and this end of the arm 75 has the form of a ring, which is screwed to a rotatable hub. This hub is formed of two annular parts 76 and 77, shown in section in Fig. 5, held together, as with screws, and having chamfered edges which cooperate to form a raceway circumferentially of the hub. An outer socket ring 78, which is secured to the fixed plate 59, surrounds the raceway of hub of the arm 75, and contains a companion raceway, an annular row of balls 79 being adapted to run in both of the raceways, thus providing an anti-friction bearing for the hub 76—77 of the arm 75.

Screwed or otherwise secured to the free end of the slotted arm 75 is a U-shaped extension 80 thereof, which is arranged to swing clear of the mechanism of the instrument, and which extends under the face plate 2 thereof, its free end carrying the diamond-shaped pointer 10. As will be more fully explained later, the actuation of the arm 75 and its extension 80, and thus the pointer 10, depends upon the presence of wind which will cause the airplane to acquire a drift.

Figure 7:
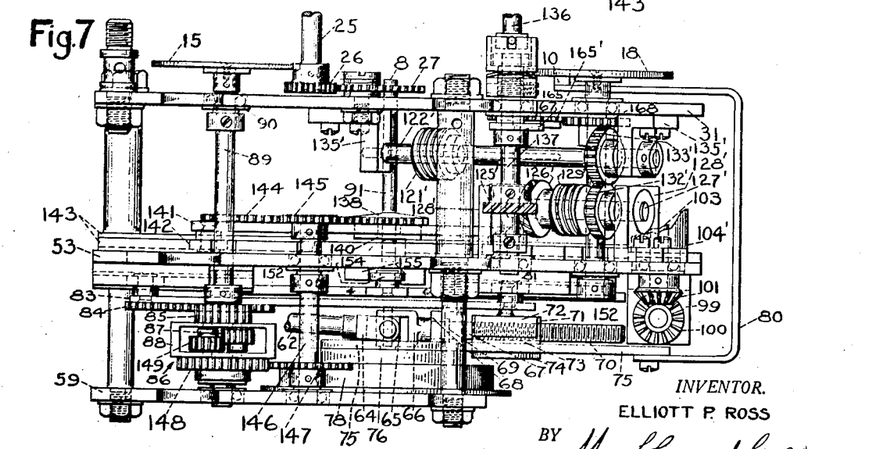
Fig. 7 is a view in elevation of the mechanism as observed in the same direction as in Fig. 5, but illustrates parts that are cut away in the latter figure, the casing omitted.

Irrespective of this, the block-like portion of the part 72 of the travelling nut 71 is provided with a pin 81, which, as shown in Figs. 5, 12 and 17 projects through a slot 82 in an L-shaped slide 83. The other leg of the slide 83 carries a rack 84 adjacent to its free end, this rack meshing with a gear 85 of a differential 86, as shown in Figs. 4, 5, 7, 8 and 17. The gear 85 is stepped and has a relatively thin inner portion of increased diameter which meshes with pinions 87, which are mounted in the spider 88 of the differential 86. The spider 88 is secured to a shaft 89, which is journalled in ball bearings 90 in the fixedly positioned plates 31 and 59, and at its upper end has mounted upon it the ground speed dial 15, which is shown in Figs. 2, 4 and 7.

It thus becomes apparent that when the pilot operates the knob 21, he effects the turning of both the air speed dial 13 and the ground speed dial 15, so that the former will show at what air speed the pilot intends to fly and the dial 15 will reveal the speed at which the airplane will progress along the desired ground course due to the component of the air speed of the plane.

Assuming that there is no wind, there will be no consequent drift of the airplane, which will be headed directly along the desired ground course.

Under these conditions, the diamond-shaped pointer 10, shown in Figs. 2, 5 and 15 will be in its zero position at the middle of the scale on the retracted edge of the central opening in the face plate 2, which scale reads to 40 at both the left and the right.

As the pilot, in conforming to the problem of Fig. 1, sets the compass dial 3 to cause the pointer 4 to give a reading of 45° to show that a ground course directly northeast is desired, the pointer 10 will also point to the 45° graduation on the compass dial 3, showing that the heading of the airplane is coincident with the desired ground course, as it should be when there is no wind.

When the airplane is headed in the direction of the ground course, the air speed and the ground speed will be the same, and the ground speed dial 15 will read against its index 16 to show the same number of miles per hour as does the air speed dial 13 in reading against its index 14. These duplicated readings being predicated on an absence of wind, the wind spot 8 will be in its zero position, which is at the intersection of the radial wind-direction lines 7, and this is also at the center of the concentric circles. Each larger circle represents a predetermined increase in wind velocity. Thus, the common center of the circles represents zero wind, and the succeeding circles represent wind velocities of, say, 10, 20, 30, 40, 50 and 60 miles per hour.

Referring to Figs. 3 and 15, the wind spot 8 is seen to be the circular end of a pin 91, which is preferably painted, and it will now be shown why the wind spot 8 remains in its zero position when there is no wind, and also how it is shifted to reveal the direction and velocity of wind, when it exists.

Figure 6:
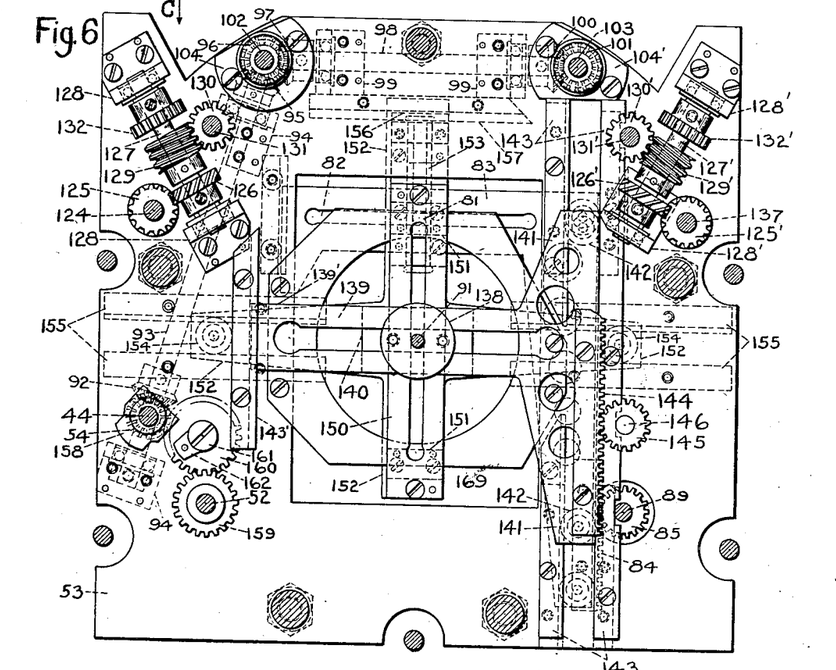
Fig. 6 is a sectional view taken approximately along the line 6—6, of Fig. 4, certain of the parts of the instrument being omitted for an improved understanding of the operation of certain other parts.
Figure 14:
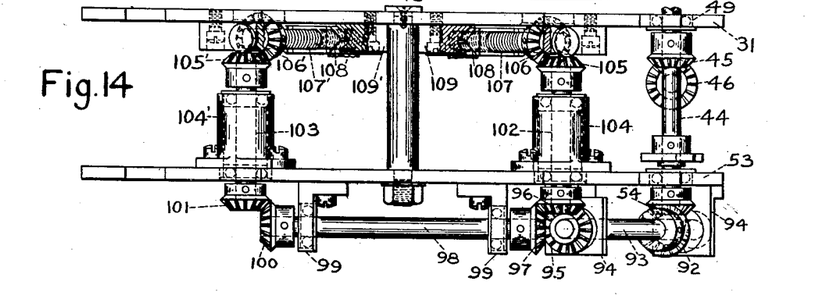
Fig. 14 is a fragmentary view observed in the direction of the arrow C in Fig. 6, to more clearly disclose certain mechanical drives, parts superfluous to this purpose being generally omitted.

When the shaft 44 turns in response to the actuation of the air speed knob 21, the miter gear 54 at the opposite end of this shaft turns still another miter gear 92, shown in Figs. 6 and 14. The miter gear 92 is affixed to a shaft 93, which is journalled in ball bearings in brackets 94, which are carried by the fixedly positioned intermediate plate 53. At its opposite end, the shaft 93 carries a miter gear 95, which meshes with another miter gear 96 that also is in mesh with still another miter gear 97. As clearly shown in Figs. 6 and 14, the gear 97 is mounted on a shaft 98, which is supported by ball bearings in bearing brackets 99, which are also secured to the fixed plate 53. The opposite end of the shaft 98 has a miter gear 100 affixed to it, the gear 100 being adapted to drive a miter gear 101.

The miter gears 96 and 101 are mounted on shafts 102 and 103, respectively, which are journalled in ball bearings which are fitted into opposite ends of the tubular supports 104 and 104' that are mounted on the fixed plate 53, these shafts having other miter gears 105 and 105' mounted on them beyond the free ends of the tubular supports. The miter gears 105 and 105' mesh, respectively, with other miter gears 106 and 106', which are shown in Figs. 9 and 14.

Shafts 107 and 107' have the gears 106 and 106' fixedly mounted on them, so as to turn therewith. The shafts 107 and 107' are screw threaded for a considerable portion of their lengths and are threaded through blocks 108 and 108', both of which have bevelled opposite sides, and are slidably mounted in pairs of guide rails 109 and 109', which are provided with V-shaped grooves into which the bevelled sides of the slidable blocks 108 and 108' fit.

Figures 9, 10, 13:
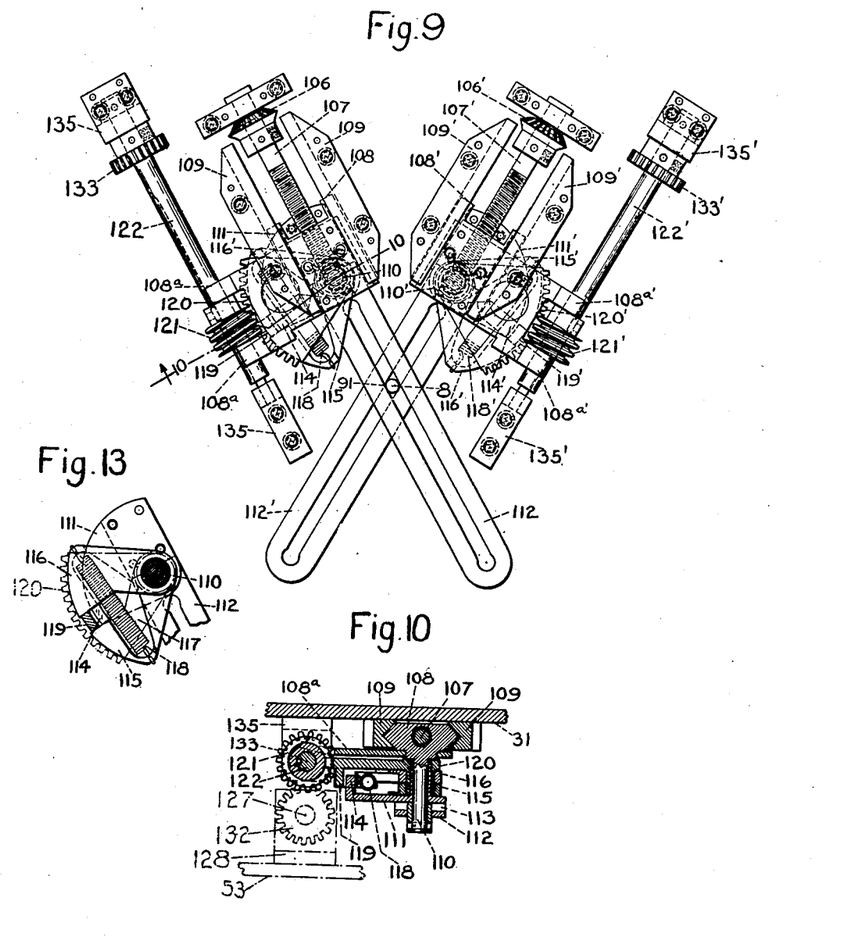
Fig. 9 is another detached view illustrating the wind-computing portion of the mechanism.
Fig. 10 is a section taken on the line 10—10, of Fig. 9.
Fig. 13 is a detail view of one of the yielding safety devices that is combined with one of the wind-spot actuating arms.

As best understood from Figs. 9, 10 and 13, each of the slidable blocks 108 and 108' has a projecting stud or pintle 110 and 110'. On the stud 110 is pivotally mounted a quadrant-shaped member 111, which is in the nature of a terminal-piece for a slotted arm 112, from which it is spaced by a distance-piece 113, shown in Fig. 10, but to which it is secured by screws passing through it, the distance-piece 113 and the slotted arm 112, combining them into a rigid member. The quadrant member 111 has a tubular hub, which fits over the stud 110, and near the center of its curved edge, the quadrant has a projecting lug 114, shown plainly in Figs. 10 and 13. As seen from the latter figure, the lug 114 is located between a pair of jaws 115 and 116, each of which is provided with a recess 117, the recess in one jaw being exposed on the side opposite to that in which the recess in the other jaw is exposed. Accommodated by the recesses 117 in the jaws 115 and 116 is a spring 118 tending to draw the jaws together.

Also extending between the jaws 115 and 116 is another lug 119 which projects from one side of a gear sector 120. The tension of the spring 118 is adequate to normally maintain the plain quadrant and the gear sector 111 and 120, respectively, and the jaws 115 and 116 which engage the lugs 114 and 119 of the quadrant and the sector, all in a given set relation with the sector 120. That is, ordinarily, it is as though these parts and the arm 112 constituted a rigid integral structure adapted to turn about the stud or pintle 110.

The position of the arm 112 is, however, fixed about the stud 110 because the gear sector 120 is in mesh with a worm 121. This worm is keyed to a shaft 122 that is provided with a lengthy keyway, whereby the worm 121 is capable of sliding longitudinally of the shaft 122, but is held from so doing by a plate 108ᵃ, which is secured to the block 108 and at its outer end is forked to embrace the worm 121.

The knob 23 is used to set the drift dial 17 with respect to its pointer 19 to show the drift due to the wind, when the airplane is on one of its preliminary trial headings. The drift knob 23 is similar to the knob 21 in Fig. 11, and it drives a shaft 123 and through a friction coupling, that is a duplicate of that illustrated in Fig. 11, to turn another shaft 124 instead of the shaft 44 of that figure. The shaft 124 is journalled in ball bearings mounted in the fixed plates 31 and 53. Carried by the shaft 124 is a spiral gear 125, shown in Fig. 6, which meshes with another spiral gear 126 on a shaft 127 that is supported in ball bearings carried by bearing brackets 128 that are mounted on the fixed plate 53.

Near the spiral gear 126 is a worm 129, which is secured on the shaft 127, and which meshes with a worm gear 130 affixed to a shaft 131. This shaft is journalled in ball bearings in the fixed plates 31 and 53, and carries the drift dial 17 that reads against the index 19, when set in accordance with available information to show the degree of airplane drift on one of the trial headings.

The shaft 127, as shown in Fig. 6, also has a spur gear 132 secured to it, which, as seen in Fig. 10, meshes with another spur gear 133 that is secured on the shaft 122, this shaft being journalled in brackets 135, which are mounted on the fixed plate 31.

It, therefore, is evident that when the knob 23 is actuated to set the airplane drift on the dial 17, there is also a consequent turning of the shaft 122, which results in the turning of the worm 121 thereon. As a result, the gear sector 120 is turned and the arm 112 is turned about the stud 110 an amount proportional to the degree of drift of the airplane.

When the airplane is on its second trial course, the knob 24 is turned, if the knob 23 was used for the first trial course, or vice versa. The knob 24 is mounted on a shaft 136, and drives through a friction coupling like that illustrated in Fig. 11, but turns a shaft 137 instead of the shaft 44 of that figure. The drive from the shaft 137 is a mechanical duplicate of that from the shaft 124 as shown in Fig. 6, the parts being identified by the same numerals affected by a prime mark for ready recognition. The shaft 137 has affixed to it a spiral gear 125' that drives another spiral gear 126' on a shaft 127'. A worm 129', which is also on the shaft 127', drives a worm gear 130', so turning a shaft 131' and the drift dial 18. The shaft 127' also carries a spur gear 132', which meshes with another spur gear 133', as shown in Fig. 7, the gear 133' being mounted on the shaft 122'.

Referring against to Fig. 9, it is clear that the shaft 122' will turn the worm 121', thereby swinging the slotted arm 112' about the stud 110' an amount proportional to the setting of the airplane drift dial 18.

When there is no wind, each dial 17 and 18 will have its zero graduation registered with its index, 19 and 20, respectively. At such times the median lines of the slots in the arms 112 and 112' will intersect exactly at the zero position of the wind spot 8, which is at the common center of the concentric wind velocity circles 6.

In view of this, the pilot may set the dial 13 with respect to its index 14 to show a reading of any desired air speed. As the knob 21 is turned, the hereinbefore traced mechanical drive effects the turning of the miter gear 106, shown in Fig. 9, thus turning the threaded shaft 107. Since the drive is extended to turn the gear 106' at the same time, both shafts 107 and 107' turn simultaneously. Being threaded into the slide blocks 108 and 108', the shafts 107 and 107' cause both of these blocks to move in the same direction and to the same extent, while the air speed knob 21 is being actuated. Due to the coincidence of the zero position of the wind-spot 8 and the intersection of the slots of the arms 112 and 112', the pin 91, which extends through these slots, and the end of which is the wind-spot 8, is not displaced because of the moving of the arms 112 and 112' longitudinally. Consequently, the wind-spot 8 remains at its zero position, when there is no drift setting, and the air speed may be freely changed without causing any change in position of the wind spot.

Wind being present, it must be taken into consideration, and usually it will affect the headings on both of the preliminary trial courses. Let it, therefore, be assumed that the pilot has set the compass ring dial 3 to read 45° against the index 4 to show a selected ground course that is directly northeast. He will then fly 30°, say, to the left of this ground course, which, in the present instance, would be 15° in azimuth from the north, as indicated by the pointer 11.

The drift is then determined by a drift bar or similar device, which is part of the equipment of the airplane and is not part of the herein disclosed instrument. Noting whether the airplane drift is to his right or left, the pilot operates the knob 23 to set the dial 17 against its index 19 an amount corresponding to the observed drift in the noted direction. In the same manner, the pilot flies on a second trial course at 30° to the right of the desired ground course, which will be 75° in azimuth from the north, as indicated by pointer 12. The pilot again employs the drift bar to note the drift, which he sets up on the drift dial 18 to read against its index 20, with due regard to the direction of the drift.

Examining Fig. 6, the turning of the knob 23 causes the turning of the shaft 124, as previously explained. As the gear 125 turns with this shaft, a drive is established through the spiral gears 125 and 126, the shaft 127, the spur gear 132 and the spur gear 133, the latter being shown in Fig. 9 as being fixed on the shaft 122. This shaft also drives the worm 121 so turning the gear sector 120.

Inasmuch as this gear sector, its lug 119, the lug 114 of the quadrant 111, the quadrant itself, the jaws 115 and 116, the spring 118 and the arm 112 are all maintained for normal movement as a unit, as already explained in connection with Fig. 13, the arm 112 will be swung about the stud 110. Thereupon, as will be understood from Fig. 9, the pin 91 bearing the wind-spot 8 will be displaced along the slot of the arm 112', which will be stationary until set for the second trial heading of the airplane.

When this occurs through the pilot turning the knob 24 to set the drift dial 18 against its index 20, the shaft 137, shown in Fig. 6, is turned, setting up a drive through the spiral gears 125' and 126', the shaft 127', the spur gear 132', which meshes with the spur gear 133' shown in Fig. 9 and is affixed to the shaft 122'. The latter shaft also rotates the worm 121', which turns the sector 120'. Since this sector, its lug 119', the lug 114' of the quadrant 111', this quadrant itself, the jaws 115' and 116', the spring 118' and the arm 112' normally move as a unit, the arm 112' moves the pin 91, which bears the wind-spot 8, longitudinally of the slot in the arm 112.

Thus, it is apparent that the slotted arms 112 and 112' move in response to the actuation of the drift knobs 23 and 24, respectively, and in so doing, co-operate in positioning the wind-spot 8, which, in the problem of Fig. 1, is located at the point $b$ in the diagram of that figure. In the instrument, the imaginary straight line from the common center of the wind velocity circles 6 to the center of the wind-spot 8 is equivalent to the wind vector $a$—$b$ shown in the diagram of Fig. 1.

Attention is again directed to the wind-spot pin 91, which is provided near one end with a disk 138, shown in Figs. 5 and 6, which may be integral with the pin 91. One side of the disk 138 lies against a slotted slide 139, and projecting into the slot of this slide is a prism-like extension of a plate 140, which bears against the opposite side of the slide 139, screws securing the plate 140 to the disk 138 that is integral with the pin 91. Thus, the plate 140 with its prism-like extension and the disk 138 form a slide that carries the pin 91, and the arms 112 and 112' co-act to position this pin slide through shifting the pin 91, as a result of the drift settings.

As a short portion of the pin 91 projects through the plate 140 and its extension that fits into the slot of the slide 139, the latter is shifted when the pin 91 is displaced. The slotted slide 139 is substantially T-shaped, and near the extremities of the cross-bar 141 of the T is provided with rollers 142 that run in grooves in a pair of parallel guide rails 143, which are mounted on the fixed plate 53. The single end 139' of the other leg of the T-shaped slide 139 rides in the groove of another guide rail 143', which is mounted on posts that are fastened to the fixed plate 53.

Secured to the cross-bar of the T-shaped slide 139 is a rack 144, which meshes with a gear 145 affixed to a shaft 146 that is journalled in ball bearings mounted in the fixed plates 53 and 59. Mounted upon the shaft 146 is a gear 147 which is in mesh with and drives another gear 148, which is part of the differential 86. The differential gear 148 is in mesh with pinions 149, which are similar to the pinions 87, and like these are mounted in the differential spider 88 that is secured to the differential shaft 89.

It has now been shown that the setting of the drift dial 17 by the turning of the knob 23, or the setting of the dial 18 by the actuation of the knob 24, results in moving the rack 144, so turning the gear 145, the shaft 146, the gear 147 and also the gear 148 which forms one side of the differential 86. Consequently, the differential spider gears 149, the differential spider 88, and the shaft 89 are operated to turn the ground speed dial 15. Thus, instead of showing a ground speed equal to the air speed, which would be the case if there was no wind, as hereinbefore explained, the dial 15 will show the actual ground speed as modified by the wind. As previously explained, this will correspond to the algebraic sum of the component $a$—$P$ of the heading vector $a$—$T_3$ and the wind component $P$—$c$, shown in the problem of Fig. 1. Hence, according to the direction of the wind, the ground speed will be greater or less than the air speed of the airplane.

In Fig. 2, the air speed and the ground speed are shown by dials 13 and 15 to be the same, since both drift dials 17 and 18 are in their zero positions, thus indicating that there is no wind. In the problem of Fig. 1, however, the wind is indicated by the vector $a$—$b$, which it was pointed out could be measured. Its component $w$—$b$ is parallel to the desired ground course, but its other component $a$—$w$ represents that amount of the wind's force which causes the airplane to drift perpendicular to the selected ground course. The wind component $w$—$b$ or its equivalent $P$—$c$ obviously is the one that modifies the component $a$—$P$ of the air speed so that it becomes the ground speed.

The shorter end of the wind-spot pin 91 also extends into a slotted straight slide 150, which is secured at opposite ends to brackets 151, as shown in Figs. 5, 6, 7 and 16. One of these brackets is secured directly to a cruciform slide 152, the other bracket 151 being fastened to a channel 153, which acts as a wear-piece, and is in turn fitted into a slot in the cruciform slide 152, and is secured to the latter as shown in Fig. 18. Near the opposite ends of one of its cross-pieces, the cruciform slide 152 is provided with rollers 154 that run in pairs of guide rails 155, the latter being attached to the fixed plate 53, as shown in Figs. 5, 6, 7 and 16. The end of another leg of the cruciform slide 152 is guided by a tongue 156 that is rigidly mounted on the channelled wear-piece 153 and slides in the groove of a guide rail 157, as shown in Figs, 5, 6, 16 and 18.

The end of the pin 81 of the travelling nut 71 lies in the channel of the wear-piece 153 as shown in Fig. 18. In view of this construction, when the wind pin 91 is shifted by the slotted arms 112 and 112', or either of them, through the operation of the drift knobs, the end of the wind pin 91 that projects into the straight slide 150, as shown in Figs. 5 and 16, displaces this slide laterally. Inasmuch as the slide 150 is rigidly combined with the cruciform slide 152, as already described, the latter slide is correspondingly displaced, and with it the wear-resisting channel 153 which it carries. The pin 81 on the travelling nut 71, being entered into the channel 153, as shown in Figs. 5, 16 and 18, is likewise displaced, as is also the travelling nut 71.

As the nut 71 is mounted in the slot of the arm 75, this arm must accompany the nut 71 and its pin 81 as they are displaced, the arm 75, therefore, being turned about the axis of its hub, which is composed of the parts 76 and 77 and is mounted in its ball bearing socket 78, shown in Fig. 5. The U-shaped extension 80 of the arm 75, of course, partakes of the same movement as the latter, shifting its diamond-shaped pointer 10 in the arcuate slot 9, shown in Fig. 2, an amount determined by the actuation of the drift knob or knobs.

When the diamond-shaped pointer 10 thus becomes set, it reads against the compass ring dial 3 to show the heading the airplane must have to traverse the desired ground course. The pointer 10 is also readable against the double reversely-extending scale to show the degrees of angle between the line of direction of the heading necessary to maintain the wished for ground course and the line of direction of the ground course itself, i. e., the angle $\theta$ of Fig. 1.

Limit stops are located at suitable places in the instrument, thus preserving the proper association of the dials and pointers, and preventing incorrect readings, as well as making possible only such actuations of the instrument's mechanism as is within the scope of its adopted scales.

The compass ring dial 3 may be freely turned in either direction without restriction, but the air speed and drift dials, 13, 17 and 18, respectively have elected upper and lower limits, and are movable only within limits established by co-acting stop elements. The air speed knob 21, and the drift knobs 23 and 24, each operate a stop device, and these particular stop devices are similar to each other.

When the air speed knob 21 is turned, it drives through the previously described friction coupling to turn the shaft 44, on which is mounted a hub from which a stop-plate 158, shown in Fig. 6, projects. It was shown that the shaft 44 also has a miter gear 45 in mesh with another miter gear 46 on the shaft 47, the worm 50 on this shaft being adapted to drive the worm wheel 51 on the shaft 52, as shown in Figs. 3 and 5. Also mounted on the shaft 52 is a spur gear 159, which is in mesh with another spur gear 160, which, as shown in Fig. 6, is mounted to turn on a stud 161. Secured to one side of the gear 160 is another stop plate 162. These stop plates, 158 and 162, are simultaneously turned, when the air speed knob 21 is operated, and the respective widths of the stop plates are such that these plates will engage each other, when they have been turned in either direction sufficiently to permit the corresponding limit of the graduations on the dial 13 to come into register with the index 14. The stop plates then prevent further rotation of the air speed dial 13 and the mechanism connected thereto.

In like fashion, the drift knob 23, which is mounted on the shaft 123, is operable to drive through a friction coupling and turn the shaft 124, on which is mounted a stop plate 163, shown in dotted lines in Fig. 3. As already described, the shaft 124 carries the spiral gear 125, which drives the spiral gear 126 on the shaft 127, as shown in Fig. 6. Also on the shaft 127 is the worm 129, which drives the worm gear 130 on the drift dial shaft 131. This shaft also has mounted upon it a spur gear 164, shown in dotted lines in Fig. 3. Driven by the gear 164 is another spur gear 165, on one side of which is secured a stop plate 166 which co-operates with the stop plate 163, in the same manner that the air speed stop plates 158 and 162 co-act.

The other drift knob 24 effects the turning of a shaft 137, shown in Fig. 6, which, as shown in dotted lines in Fig. 3, has mounted upon it a stop plate 167. By driving through spiral gears 125' and 126', shown in Fig. 6, the shaft 137 effects the turning of the shaft 127', the worm 129' on the latter and the worm gear 130' to turn the other drift dial shaft 131'. This shaft also carries a spur gear 164' that drives another gear 165', on which is a stop plate 168, as shown in Fig. 3, and the stop plates 167 and 168 co-act like the stop plates 163 and 166, and stop the drift dial 18 and the mechanism operable by its actuating knob 24, when the limits of the dial's setting have been reached.

A different type of limit stop is used for the wind spot pin 91 to restrict the wind spot 8 to its circular field of wind measurement. As seen in Figs. 5 and 15, the annular plate 30 lies parallel with and adjacent to the transparent plate 5, which bears the concentric wind velocity circles and radial wind direction lines. The ring plate 30 is a limit plate, as is the octagonal plate 169, shown in Figs. 6 and 16, which octagonal plate is secured, as by screws, to one side of the intermediate fixed plate 53, and spans a relatively large rectangular central opening therein. Two opposite sides of the octagonal limit plate 169 are parallel with but spaced from the adjacent edges of the rectangular opening in the fixed plate 53, so creating slots in which the brackets 151, which connect the slides 150 and 152, are adapted to travel as clearly shown in Fig. 16. The octagonal limit plate 169 is provided with a large central opening, which is circular and of the same diameter as the inner diameter of the ring stop plate 30. The diameters of the circular central openings in the stop plates 30 and 169, are preferably equal to that of the inside diameter of the compass ring dial 3.

In measuring increasing wind velocity, the wind spot 8 moves outward away from the common center of the concentric wind velocity circles, and as the spot 8 is the end of the pin 91, this pin is what really is moving in the just mentioned direction. After passing the outermost wind velocity circle, the side of the spot-bearing pin 91 will, at one end, engage the inner circular edge of the limit plate 30 shown in Figs. 5 and 15. At the same time, the opposite end of the pin 91 will engage the circular edge of the octagonal limit plate 169 shown in Figs. 5 and 16. The pin 91 will thereupon be restrained from further outward travel. The pilot, however, may find it necessary to continue turning one of the drift knobs, say the knob 23, in order to cause the dial, as the dial 17, to register the full degree of the airplane drift against the index, as the index 19. In such a case, the safety device shown in Fig. 13, functions.

If it is the drift knob 23 that is being operated, and the wind pin 91 is prevented by the limit plates 30 and 169 from having further outward movement, the shaft 122 continues to turn and with it the worm 121. This swings the gear sector 120, shown in Fig. 9, about its center so that its lug 119 is displaced. The restrained wind pin 91 prevents the arm 112 from turning, and, hence, the quadrant-shaped terminal 111 of that arm, and its lug 114.

From Fig. 13, it will be clear, then, that the quadrant's lug 114 will hold the jaw from swinging about its pivot, but the gear sector lug 119 swings the jaw 115, as the pilot continues to turn the drift knob 23. The spring 118, which connects the jaws 115 and 116 is accordingly stretched, and the wind-spot 8 will, for the time being, register an erroneous reading.

When, however, the pilot operates the other drift knob 24, while on the second trial course, the arm 112' will be actuated in the manner now set forth, and the two arms 112 and 112' will co-act to properly position the pin 91 and its wind-spot 8 with reference to the concentric wind velocity circles 6 and the radial wind direction lines 7 on the transparent plate 5. The wind-spot 8, in moving inwardly to the proper place in the field of wind measurement, is relieved of its stoppage of movement, and the parts shown in Fig. 13, including the jaws 115 and 116, the quadrant 111 of the slotted arm 112 and the gear sector 120, together with their lugs 114 and 119, are brought back to their normal correlation, as shown in Fig. 13, by the spring 118. This, of course, is also true of the parts associated with the arm 112'.

It has already been shown that the distance from the common center of the concentric wind velocity circles 6 to the center of the wind spot 8 corresponds, in the instrument, to the wind vector $a$—$b$ of the diagram of Fig. 1.

Further considering the instrument, the distance from the common center of the concentric wind velocity circles 6, on the transparent plate 5, to the center of the stud 110, which is carried by the sliding block 108 is equivalent to the vector $a$—$T_1$ in the diagram of Fig. 1. Similarly, the distance from this same common center of the wind velocity circles 6 to the center of the stud 110', in the instrument, represents the vector $a$—$T_2$, of Fig. 1.

The center of the rocket ring 78 for the hub of the arm 75 is axially aligned with the common center of the velocity circles 6, and may also be considered as the point $a$ in the diagram of Fig. 1. Therefore, the projected distance of the center of the socket ring 78 to the center of the pin 81 is indicative of the vector $a—T_3$, in Fig. 1.

From the foregoing mechano-graphical comparisons, it is evident that the various vectors present in the problem of Fig. 1 are present in the instrument, through the existance, in a mechanical way, of their respective terminals and the theoretical straight lines joining them. The axis on which lies the common center of the wind velocity circles 6, also represented at $a$ in Fig. 1, is seen to be a common reference line, its end showing as a common reference point. Moreover, in the instrument, the imaginary straight line from the common center of the wind velocity circles 6 to the compass pointer 4 represents the desired ground course, which in Fig. 1 is shown by the line $a—c$ and represents a due northeast course.

Angularly displaced equal amounts each side of the compass pointer 4 are the trial heading fixed pointers 11 and 12. Consequently, the equal angles each side of the imaginary line from the center of the circles 6 to the compass pointer 4, the other sides of which angles are defined by other imaginary lines from the center of the circles 6 to the pointers 11 and 12, are equal to the angles $\alpha$ of Fig. 1. A further comparison shows that the angle between the straight lines from the center of the circles 6 to the zero graduation of the compass dial 3 and to the diamond-shaped pointer 10 is representative of the angle $\beta$. Then, the angle between straight lines from the center of the circles 6 to the diamond-shaped pointer 10 and to the compass pointer 4 corresponds to the angle $\theta$ of Fig. 1. The angle $\gamma$ of Fig. 1 is set up by the drift dial 17 and its index 19, while the angle $\phi$ of the diagram is set up by the drift dial 18 and its index 20.

It has been demonstrated how these various values are set up in the instrument, and it is obvious that the settings may be made in accordance with the conditions encountered at the time the instrument is in use. The instrument is compact, light, yet sufficiently rugged to meet any probable service conditions, and is simple to operate and utilize.

I claim:—

1. In a navigational instrument, means for indicating a selected course of a craft, and mechanism for establishing vectors adapted in part to be set in accordance with the drift of the craft, said mechanism having a portion responsive to said drift-set part thereof to indicate the heading of the craft necessary for it to traverse the selected course.

2. In a navigational instrument, means for indicating a selected course of a craft, and vector-establishing mechanism having independently operable portions adapted to be variously set in accordance with the drift of the craft, another portion of said mechanism being operable responsively to the actuation of one or more of said independently operable portions to indicate a deviating heading for the craft which will prevent the same from deviating from the selected course.

3. In a navigational instrument, air speed, ground speed and drift indicators, vector-establishing mechanism having a portion operable to set the magnitude of the vectors and the air speed and ground speed indicators, said mechanism having another portion operable with said drift indicators and means controlled thereby to alter the ground speed indicator reading in accordance with the drift.

4. In a navigatonal instrument, a course designator for an aircraft, air speed and ground speed indicators, vector-establishing mechanism having a vector magnitude setting portion operable to similarly set said indicators, said mechanism having another portion operable in accordance with the drift of the aircraft, and means responsive thereto to change the setting of the ground speed indicator to show the ground speed of the aircraft on a selected course.

5. In a navigational instrument having a reference axis, mechanism comprising subdivisional portions each containing a member possessing a point movable with respect to the reference axis to establish a representation of a vector, means for moving a plurality of said point-possessing members in accordance with the magnitude of the air speed of an air craft, and aircraft-drift indicating means for actuating one of said vector-establishing portions of said mechanism to indicate the required heading for a predetermined aircraft course.

6. In a navigational instrument having a reference axis, mechanism comprising members possessing points movable with respect to the reference axis to establish theoretical vectors, some of which represent trial courses for an aircraft and another of which represents a required heading for the aircraft to traverse a predetermined ground course, part of said mechanism being operable to relatively position said point-possessing members and reference axis in accordance with the aircraft speed to represent the magnitude of the vectors, and another part of said mechanism being movable in accordance with the drift of the aircraft to angularly locate the vector which represents the required heading of the aircraft.

7. In a navigational instrument having a reference axis, members possessing points movable with respect to said axis to establish theoretical vectors representing trial courses and a related required heading for an aircraft to cause it to traverse a predetermined ground course, air speed and ground speed indicators, means adapted to correspondingly set both indicators and the magnitude of the vectors, means adapted to indicate the drift of the aircraft operable to angularly displace the point-possessing member of the required-heading vector and to correctively actuate the ground speed indicator, and direction-indicating means associated with said angularly displaceable member.

8. In a navigational instrument having a reference axis, movable members possessing points representative of vector terminals, means operable in accordance with the speed of an aircraft to position certain of said members so that their vector terminal points are spaced from the reference axis by amounts corresponding to the magnitudes of the respective vectors, means operable in accordance with the drift of the aircraft to angularly displace one of said members, and a course designator to co-act therewith to show the proper heading for a predetermined ground course.

9. In a navigational instrument having a reference axis, members possessing points representing vector terminals, means operable in accordance with the speed of an aircraft to position certain of said members so that the distances of their points from the reference axis represent vectors, a pair of which vectors include an angle, a line dividing this angle representing a ground course, means for operating one of said members in accordance with the drift of the aircraft to angularly displace its point thereby providing another of the vectors with a direction indicative of the heading of the aircraft necessary for it to traverse the ground course, and means for indicating the same.

10. In a navigational instrument having a reference axis, members possessing points movable with respect to the reference axis to establish distances that represent vectors, a pair of which vectors include an angle, a line dividing this angle representing a ground course, drift-indicating means for operating others of said members in accordance with the drift of the aircraft, one of the latter members establishing a vector having a direction indicative of the heading of the aircraft necessary for it to traverse the ground course, another of the drift-affected members establishing a vector showing the direction and velocity of the wind, and a designator for indicating a selected ground course.

11. In a navigational instrument having a reference axis, members possessing points movable with respect to the reference axis to establish distances that represent vectors, a pair of which represent aircraft trial courses angularly displaced with respect to a line representing the ground course of an aircraft, aircraft-drift indicating means operable to position others of said members so that one establishes a vector indicative of the heading of the aircraft to enable it to traverse the ground course, another of the last mentioned members being positioned to establish a wind vector which also represents a side common to theoretical parallelograms of which the other vectors are diagonals, and means for indicating a selected ground course and indicating the aircraft heading.

12. In a navigational instrument having a reference axis, members possessing vector terminal indicating points, actuating means for said members operable in accordance with the speed and drift of an aircraft to relatively position said points and reference axis so that the distances between the former and latter represent vectors, means for giving an indication of the path of a ground course, means maintaining an angular disposition of a pair of vectors relative to the indicated ground course path to represent trial aircraft courses, another of said vectors being positioned in accordance with the drift of the aircraft to indicate the heading necessary for the aircraft to traverse the ground course, and direction-selecting means adapted to cooperate with said ground course indication.

13. In a navigational instrument having a reference axis, members possessing vector terminal indicating points, actuating means for said members to position said points in accordance with the speed and drift of an aircraft so that the distances therefrom to the reference axis represent vectors, a pair of which vectors represent trial aircraft courses and form an angle, and means for establishing a ground course line which equally bisects this angle, other of said vectors being displaceable in accordance with the drift of an aircraft, one of these vectors indicating the heading required for the aircraft to traverse the ground course and another of the vectors representing the direction and velocity of the wind, said trial course and heading vectors being diagonals of theoretical parallelograms of which the wind vector is a common side.

14. In a navigational instrument, a course index, trial heading indexes in fixed angular relation thereto, an azimuth dial against which said indexes are adapted to read relatively adjustable to the latter, mechanism operable to establish vectors the direction of some of which are indicated on said azimuth dial by said trial heading indexes and another index operable in accordance with another of the vectors to indicate on the azimuth dial the heading of a craft necessary for it to traverse the course indicated thereon by the course index.

15. In a navigational instrument, a course index, trial heading indexes in fixed angular relation thereto, an azimuth dial against which said indexes are adapted to read relatively adjustable to the latter, mechanism operable to establish vectors the direction of some of which are indicated on said azimuth dial by said trial heading indexes, another index operable in accordance with another of the vectors to indicate on the azimuth dial the heading of a craft necessary for it to traverse the course indicated thereon by the course index and means to indicate the angle between the last mentioned heading and the course.

16. In a navigational instrument, a ground course index and trial heading indexes, an azimuth dial relatively adjustable to said indexes, mechanism including individual vector-establishing mechanisms, means for setting a plurality of them in accordance with the speed of an aircraft to establish the magnitude of their vectors, means for angularly setting one of said mechanisms in accordance with the drift of the aircraft, and an index operable thereby to indicate on the azimuth dial the heading of the aircraft for a predetermined ground course.

17. In a navigational instrument, a ground course index and trial heading indexes, an azimuth dial relatively adjustable to said indexes, air speed, ground speed and drift indicators, mechanism including individual vector-establishing mechanisms, means for setting the air speed indicator and some of said mechanisms to establish the magnitude of their vectors, drift indicator setting means operable to set one of said vector mechanisms, an index actuated thereby to indicate on the azimuth dial the heading of an aircraft for a predetermined ground course, and algebraic adding means for setting the ground speed indicator.

18. In a navigational instrument, a ground course index and trial heading indexes, an azimuth dial relatively adjustable to said indexes, air speed, ground speed and drift indicators, mechanism including individual vector-establishing mechanisms, means for setting the air speed indicator and some of said mechanisms to establish the magnitude of their vectors, drift indicator setting means operable to set one of said vector mechanisms, an index actuated thereby to indicate on the azimuth dial the heading of an aircraft for a predetermined ground course, algebraic adding means for setting the ground speed indicator, and wind direction and velocity indicating means operable by certain of said vector mechanisms.

19. In a navigational instrument, ground course and heading indexes, an azimuth dial having relative adjustment thereto, and means for setting said dial and indexes to indicate a predetermined ground course, heading for trial aircraft flights and a heading to enable an aircraft to traverse the indicated ground course.

20. In a navigational instrument, ground course and trial heading indexes maintained in fixed angular relation to each other, an annular azimuth dial, and means for effecting relative rotary adjustment of said azimuth dial to said indexes.

21. In a navigational instrument, an annular azimuth dial, ground course and trial heading indexes disposed radially of said dial and in fixed relation to each other, means for effecting relative rotary adjustment of said dial to said indexes, and a heading index for maintaining a course said index being movable circumferentially of said dial.

22. In a navigational instrument, ground course and heading indexes, one displaceable with respect to the other, an annular azimuth dial having relative rotary adjustment thereto and each index being readable thereagainst, said dial also having a central portion provided with wind direction and velocity scales, a wind index, and means for positioning the same with respect to said scales in accordance with the drift of an aircraft.

23. In a navigational instrument, ground course and trial heading indexes, an azimuth dial relatively adjustable thereto, a ground speed indicator, vector-establishing mechanisms, means operable in accordance with the drift of an aircraft adapted to actuate one of said vector-establishing mechanisms, an index responsive thereto to show on said dial the heading required to maintain the aircraft on a selected ground course, an operating connection from the last mentioned vector-establishing mechanism to said ground speed indicator including a differential gear train and adapted to so affect said indicator that it will show the algebraic sum of the component of the speed of the aircraft due to its heading and the component of the wind which increases or diminishes the speed of the aircraft.

24. In a navigational instrument, course and heading indexes, an annular azimuth dial having relative rotary adjustment thereto and against which each index is readable, said dial having a transparent central portion provided with angularly progressing wind-direction-indicating graduations and radially progressing wind-velocity graduations, a wind index, and means for positioning the same with respect to said graduations in accordance with the wind that produces the drift of an aircraft.

25. In a navigational instrument having a reference axis, a dial bearing measuring graduations representing the direction and velocity of wind, individual vector-establishing mechanisms in fixed angular disposition to each other and having co-acting members, a wind index member under the control of said co-acting members, means adapted to be set in accordance with the speed of a craft to operate said mechanisms to establish the magnitude of their vectors from the reference axis without affecting said wind index member, and means adapted to be set in accordance with the drift of the craft to actuate said mechanisms so that their co-acting members position said wind index member with respect to the wind-measuring graduations.

26. In a navigational instrument, ground course and heading indexes, an azimuth dial relatively adjustable thereto, air speed and ground speed indicators, individual vector-establishing mechanisms having positions representative of an absence of wind, means including a differential gear train adapted when said vector-establishing mechanisms are in said positions to actuate both of said indicators to show the same speed, means for setting some of said vector-establishing mechanisms in accordance with the drift of an aircraft and an operative connection from one of said mechanisms to said differential gear train to cause the latter to vary the ground speed upon the actuation of said drift setting means.

27. In a navigational instrument, adjustable means including an azimuth scale for selecting a ground course and trial headings therefor, vector-establishing mechanisms, movement-limiting stop devices for said mechanisms, an index operable by one of said vector-establishing mechanisms to show a heading for an aircraft to enable the latter to maintain a selected ground course, speed and drift dials actuating means for said vector-establishing mechanisms and dials, and yielding connections permitting movement of said dials after the stoppage of movement of said vector-establishing mechanisms.

28. In a navigational instrument, ground course and heading designating means adapted to be set, a pair of vector-establishing mechanisms maintained in permanent angularity to each other and each comprising a slide and actuating means therefor, crossing slotted arms pivoted on said slides and movable therewith, a wind index pin extending through said arms and movable under the control thereof, a wind measure co-acting with said pin, means operable to position said slides in accordance with the speed of an aircraft, and means adapted to turn either of said arms in accordance with the drift of the aircraft.

29. In a navigational instrument, ground course and trial heading designating means adapted to be set at will and including an azimuth scale, air speed and drift indicators, operating devices therefor, a pair of vector-establishing mechanisms in fixed angular disposition to each other and provided with crossing slotted arms, a wind vector-establishing mechanism having a pin extending through said arms and mounted for lateral displacement in a plurality of directions, a vector-establishing mechanism provided with an index for indicating on said azimuth scale a required heading for a selected ground course, means actuated by the operating device for the air speed indicator adapted to set the magnitude of the vector-establishing mechanisms except for the one relating to the wind, means responsive to the operating devices for the drift indicators adapted to effect the setting of the required heading vector-establishing mechanism and its index, a ground speed indicator, means for actuating the same from the last mentioned vector-establishing mechanism when it is set for its vector magnitude, and other means including a differential gear train for operating said ground speed indicator from a part of the same vector-establishing mechanism to effect a correction for the drift of an aircraft.

In testimony whereof I affix my signature.

ELLIOTT P. ROSS.